United States Patent
Kenney et al.

(10) Patent No.: US 9,285,988 B2
(45) Date of Patent: Mar. 15, 2016

(54) PORTABLE ELECTRONIC DEVICE HAVING TOUCH-SENSITIVE DISPLAY WITH VARIABLE REPEAT RATE

(75) Inventors: Jeffrey Brent Kenney, Kanata (CA); Deepankar Banshilal Jain, Winona Lake, IN (US)

(73) Assignee: BlackBerry Limited, Waterloo, Ontario (CA)

( * ) Notice: Subject to any disclaimer, the term of this patent is extended or adjusted under 35 U.S.C. 154(b) by 283 days.

(21) Appl. No.: 13/028,042

(22) Filed: Feb. 15, 2011

(65) Prior Publication Data

US 2011/0258542 A1    Oct. 20, 2011

Related U.S. Application Data

(60) Provisional application No. 61/326,083, filed on Apr. 20, 2010.

(51) Int. Cl.
*G06F 3/048* (2013.01)
*G06F 3/041* (2006.01)
*G06F 3/0488* (2013.01)
*G06F 3/0484* (2013.01)

(52) U.S. Cl.
CPC ........ *G06F 3/04886* (2013.01); *G06F 3/04847* (2013.01); *G06F 3/04883* (2013.01)

(58) Field of Classification Search
CPC ...................................................... G06F 3/048
USPC ................... 715/702, 856–860, 863; 345/173
See application file for complete search history.

(56) References Cited

U.S. PATENT DOCUMENTS

| | | | |
|---|---|---|---|
| 4,263,582 A | | 4/1981 | Dumbovic |
| 5,581,243 A | * | 12/1996 | Ouellette et al. ............... 345/173 |
| 6,094,197 A | * | 7/2000 | Buxton et al. ................. 715/863 |
| 6,690,365 B2 | * | 2/2004 | Hinckley et al. ............... 345/173 |
| 7,683,889 B2 | | 3/2010 | Rimas Ribikauskas et al. |
| 2003/0043113 A1 | * | 3/2003 | Itoh ............................... 345/156 |
| 2005/0024322 A1 | | 2/2005 | Kupka |
| 2005/0024341 A1 | | 2/2005 | Gillespie et al. |
| 2008/0316183 A1 | * | 12/2008 | Westerman et al. .......... 345/173 |
| 2009/0125824 A1 | | 5/2009 | Andrews et al. |
| 2009/0201261 A1 | * | 8/2009 | Day ............................... 345/173 |

(Continued)

FOREIGN PATENT DOCUMENTS

| | | |
|---|---|---|
| WO | 2008013350 A2 | 1/2008 |
| WO | 2010018579 | 2/2010 |

OTHER PUBLICATIONS

International Search report dated May 24, 2011. In corresponding application No. PCT/CA2011/050101.

(Continued)

*Primary Examiner* — Tadeese Hailu
*Assistant Examiner* — Darrin Hope
(74) *Attorney, Agent, or Firm* — Fish & Richardson P.C.

(57) ABSTRACT

A method of controlling the repeat rate of a button displayed on a touch-sensitive display of a portable electronic device is described. In accordance with one embodiment, there is provided a method of controlling touch input on a touch-sensitive display of a portable electronic device, the method comprising: displaying a user interface screen having at least one button on the touch-sensitive display; activating a variable repeat control mode in response to activation input; and repeating an action associated with the button at a rate in dependence on predetermined control input.

20 Claims, 6 Drawing Sheets

(56) References Cited

U.S. PATENT DOCUMENTS

| | | | |
|---|---|---|---|
| 2009/0251438 A1 | 10/2009 | Westerman et al. | |
| 2009/0303188 A1* | 12/2009 | Triplett | 345/173 |
| 2010/0031186 A1 | 2/2010 | Tseng et al. | |
| 2010/0134425 A1* | 6/2010 | Storrusten | 345/173 |
| 2010/0333027 A1* | 12/2010 | Martensson et al. | 715/833 |
| 2011/0148770 A1* | 6/2011 | Adamson et al. | 345/173 |
| 2011/0291940 A1* | 12/2011 | Ghassabian | 345/169 |

OTHER PUBLICATIONS

Unknown authors, Implementing input repeat rate in XNA?, http://www.windows-tech.info/5/a22416b5692f1909.php, date unknown.

Unknown authors Touch Screen Onscreen Keyboard, http://www.sitekiosk.com/fr-FR/Help/SiteKiosk/basicversion/14touchscreen.htm, date unknown.

Examination Report mailed Apr. 8, 2013, in corresponding United Kingdom patent application No. GB1218847.0.

Office Action mailed May 26, 2014; in corresponding Canadian patent application No. 2,796,078.

Office Action issued in Canadian Application No. 2,796,078 on Apr. 9, 2015; 4 pages.

European Patent Office, Extended European Search Report dated Feb. 18, 2015 in respect of EP Application No. 11154577.8.

Office Action issued in DE Application No. 11 2011 101 380.9 on Nov. 28, 2014; 10 pages.

\* cited by examiner

PORTABLE ELECTRONIC DEVICE HAVING TOUCH-SENSITIVE DISPLAY WITH VARIABLE REPEAT RATE

CROSS-REFERENCE TO RELATED APPLICATION

The present application claims priority to, and the benefit of, provisional U.S. patent application Ser. No. 61/326,083, filed Apr. 20, 2010, which is incorporated herein by reference in its entirety.

TECHNICAL FIELD

The present disclosure relates to portable electronic devices, and in particular to portable electronic devices having touchscreen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. Performing repetitive actions on touch-sensitive displays while maintaining an efficient graphical user interface is a challenge for portable electronic devices having touch-sensitive displays. Accordingly, improvements in controlling inputs of touch-sensitive displays of portable electronic devices are desirable.

DETAILED DESCRIPTION OF EXAMPLE EMBODIMENTS

Figure 1:
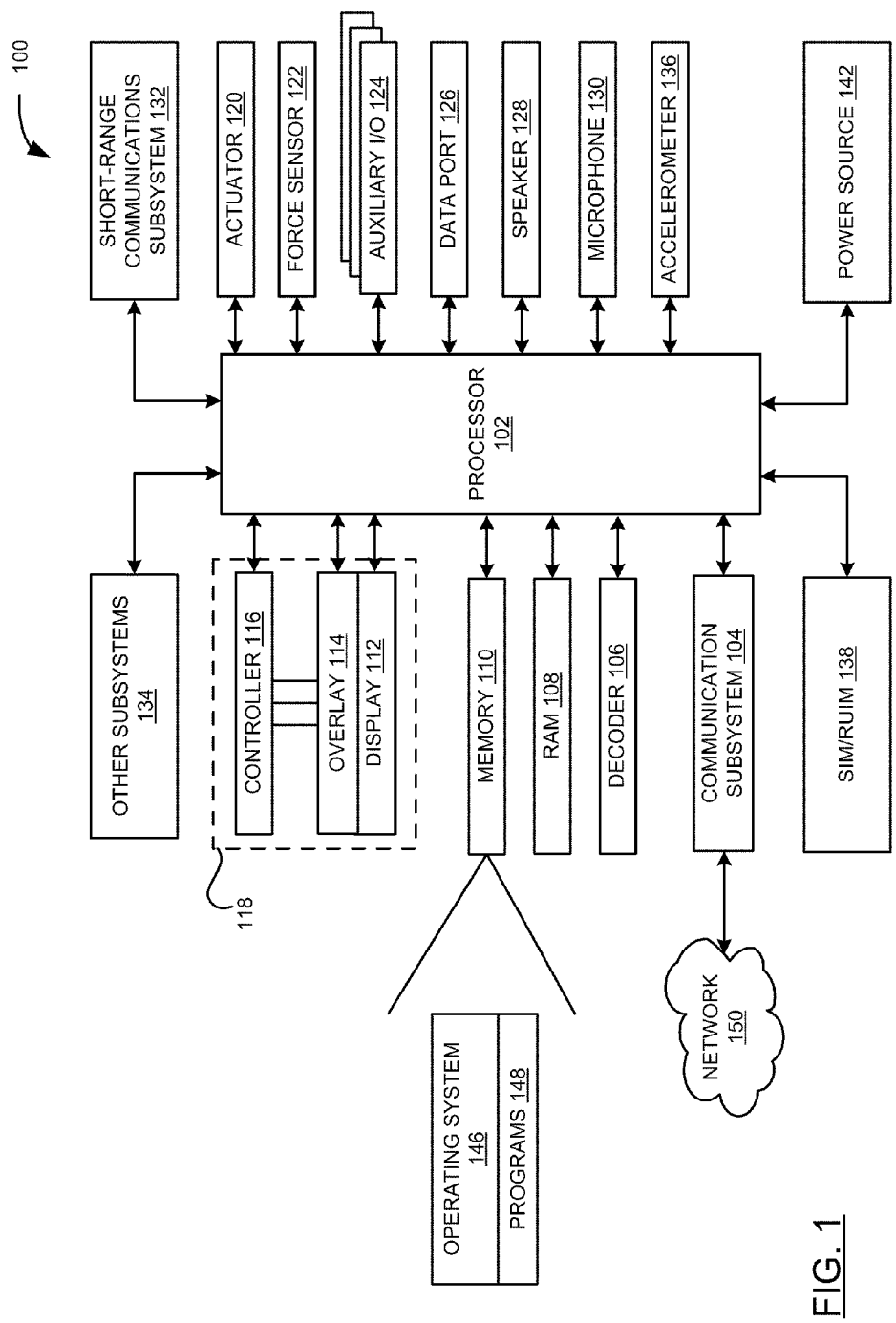
FIG. 1 is a simplified block diagram of components including internal components of a portable electronic device suitable for carrying out the example embodiments of the present disclosure.

The present disclosure provides a method of controlling the repeat rate of a button displayed on a touch-sensitive display of a portable electronic device. When the button is activated, input received by the portable electronic device may be used to vary the repeat rate of the button. The repeat rate may be varied by an amount proportional to the input received by the portable electronic device. When the input is a touch gesture detected by the touch-sensitive display, the speed and/or distance of the detected touch gesture may be used to proportionally vary the repeat rate of the button. A visual indication of the input for varying the repeat rate of the button may be displayed on the touch-sensitive display.

In accordance with one embodiment of the present disclosure, there is provided a method of controlling touch input on a touch-sensitive display of a portable electronic device, the method comprising: displaying a user interface screen having at least one button on the touch-sensitive display; varying a repeat rate of an action associated with the button in response to received input; and repeating the action associated with the button at the repeat rate, for example, when predetermined control input is received. In some examples, the repeat rate is varied in response to receiving selection input activating the button. In some examples, the repeat rate is varied by an amount proportional to the received input. In some examples, the action is inputting a character.

In accordance with another embodiment of the present disclosure, there is provided a method of controlling touch input on a touch-sensitive display of a portable electronic device, the method comprising: displaying a user interface screen having at least one button on the touch-sensitive display; activating a variable repeat control mode in response to activation input; and repeating an action associated with the button at a rate dependent on predetermined control input. In some examples, the action is inputting a character.

In some examples, a visual indication of the predetermined control input for varying the rate of repeating the action is displayed on the touch-sensitive display when the variable repeat control mode is activated.

In some examples, a variable repeat control mode area is defined for receiving the predetermined control input. In some examples, a visual indication of the variable repeat control mode area is displayed on the user interface screen when in the variable repeat control mode.

In accordance with a further embodiment of the present disclosure, there is provided a portable electronic device, comprising: a processor; a touch-sensitive display having a touch-sensitive overlay coupled to the processor; wherein the processor is configured for: causing displaying of a user interface screen having at least one button on the touch-sensitive display; activating a variable repeat control mode in response to activation input; and repeating an action associated with the button at a rate dependent on predetermined control input.

In accordance with yet a further embodiment of the present disclosure, there is provided a portable electronic device, comprising: a processor; a touch-sensitive display having a touch-sensitive overlay coupled to the processor; wherein the portable electronic device, for example via the processor, is configured for performing the method(s) set forth herein.

In accordance with yet a further embodiment of the present disclosure, there is provided a computer program product comprising a computer readable medium having stored thereon computer program instructions for implementing a method on a portable electronic device for controlling its operation, the computer executable instructions comprising instructions for performing the method(s) set forth herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computing devices, and so forth. The portable electronic device may also be a portable electronic device with or without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100. While the shown portable electronic device 100 is a "bar" or "brick" style device, the present disclosure is intended to capture all types of form factors including, but not limited to, slider-style and flip-style devices.

The processor 102 interacts with other components, such as Random Access Memory (RAM) 108, memory 110, a display 112 (such as a liquid crystal display (LCD)) with a touch-sensitive overlay 114 operably coupled to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communications subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
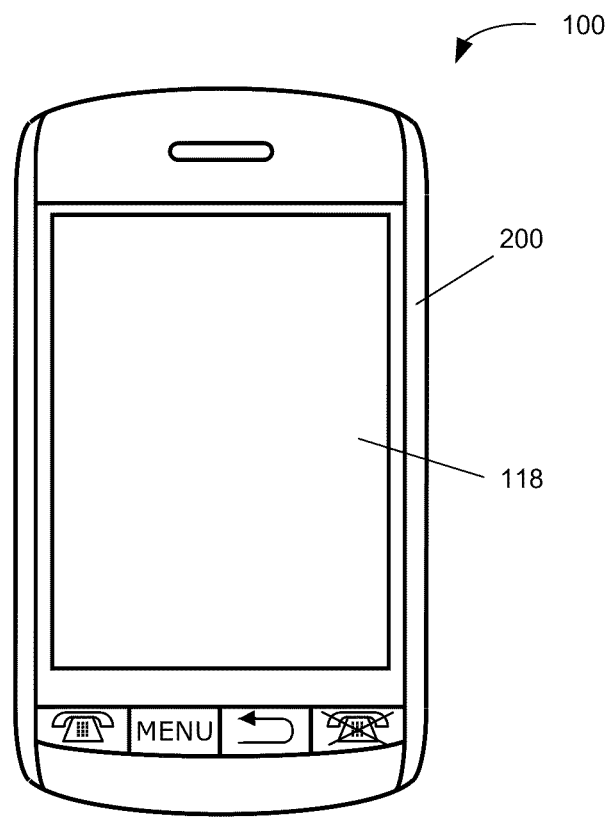
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is described herein in the context of fingers of a device user for purposes of convenience only. It will be appreciated that a stylus or other object may be used for interacting with the touch-sensitive display 118 depending on the type.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. In other embodiments, the actuator(s) 120 may be omitted.

Figure 3:
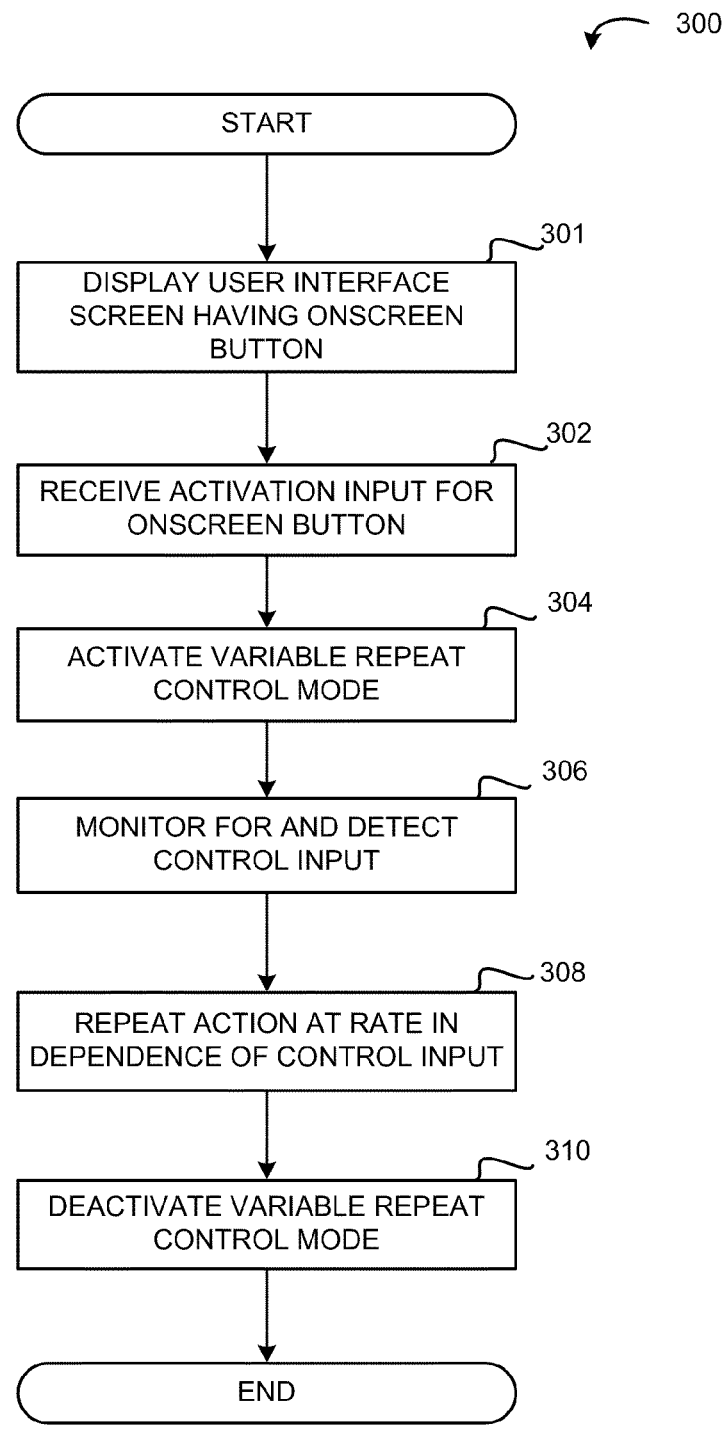
FIG. 3 is a flowchart illustrating an example method of controlling the repeat rate of a button displayed on a touch-sensitive display in accordance with one example embodiment of the present disclosure.

A flowchart illustrating an example embodiment of a method 300 of controlling the repeat rate of a button in a user interface screen displayed on the touch-sensitive display 118 of the portable electronic device 100 is shown in FIG. 3. The method 300 may be carried out by software executed, for example, by the processor 102. Coding of software for carrying out such a method 300 is within the scope of a person of ordinary skill in the art given the present disclosure. The method 300 may contain additional or fewer processes than shown and/or described, and may be performed in a different order. Computer-readable code executable by at least one processor 102 of the portable electronic device 100 to perform the method 300 may be stored in a computer-readable medium such as the memory 110.

In a first step 301, the portable electronic device 100 displays a user interface screen having at least one button having a repeatable action on the touch-sensitive display 118. The user interface screen may be any user interface screen and the button, sometimes referred to as a virtual button or onscreen button, may be any button or key having a repeatable action. In the example embodiments shown in FIGS. 4A, 4B and 5A to 5C, the user interface screen is a text entry user interface screen, such as a message composition user interface screen, and the button is a keyboard button.

Examples of buttons having a repeatable action include, but are not limited to, the ENTER (or delimiter) button, space button, backspace button, numeric buttons and symbol buttons. The button may be any onscreen button or (key) such as a letter button configured to use the activation input for variable repeat control mode, described below.

The input used for activation input may be used by one or more buttons for some other purpose in which case the variable repeat control mode cannot be used for such buttons. For example, in some embodiments, the activation input for activating the variable repeat control mode is a touch and hold gesture which, for letter buttons, may be used for capitalization or invoking accent popup menus. Accordingly, the touch and hold gesture may not be used for activating the variable repeat control mode for letter buttons in such embodiments. However, if an input other than a touch and hold gesture is used for activating the variable repeat control mode, the variable repeat control mode may be used for letter buttons. Alternatively, the input for capitalization or invoking accent popup menus may be changed to an input other than a touch and hold gesture.

Figure 4A:
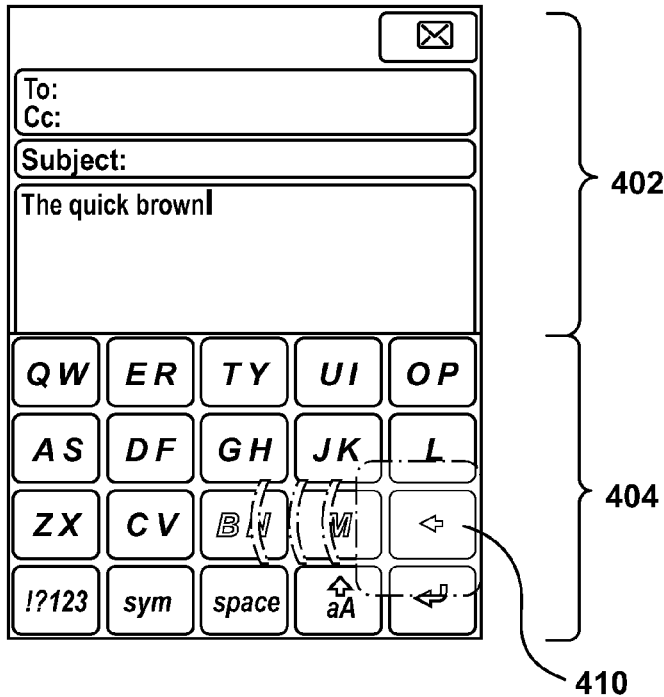
FIGS. 4A and 4B are example user interface screens having a backspace button with a variable repeat rate in accordance with the present disclosure.
Figure 4B:
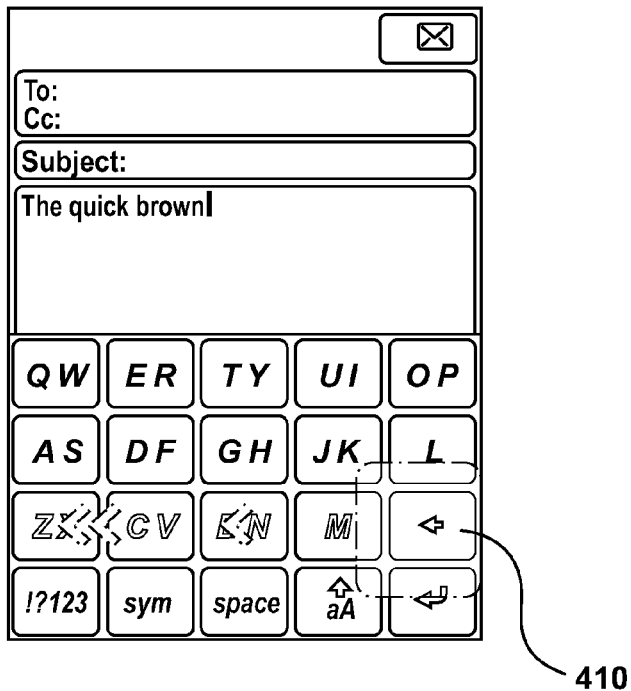

Referring now to FIGS. 4A and 4B, example user interface screens having a backspace button with a variable repeat rate in accordance with the present disclosure are shown. FIG. 4A shows a message composition user interface (UI) screen for composing electronic messages such as email messages in a portrait screen orientation. The message composition UI screen comprises a message portion 402 and a keyboard 404 sometimes referred to as a virtual keyboard or onscreen keyboard. In the shown example, the keyboard 404 is located below the message portion 402 and is a reduced keyboard. A full keyboard may alternatively be used, for example, when the message composition UI screen is in a landscape screen orientation.

The keyboard 404 includes a backspace button 410 having a variable repeat rate in accordance with the present disclosure. The backspace button 410 is activated in the message composition UI screen shown in FIG. 4A. When the backspace button 410 is activated, the appearance of the backspace button 410 is changed from a first visual state which provides a visual indication that the variable repeat control mode of the backspace button 410 is not activated (e.g., deactivated) to a second visual state which provides a visual indication that the variable repeat control mode of the backspace button 410 is activated. The second visual state is different than the first visual state; however, the implementation of the first visual state and second visual state may vary between embodiments.

In the shown embodiment, the background colour and text colour of the backspace button 410 is changed in response to activation and deactivation, respectively. In some embodiments, the backspace button 410 may have a background colour of blue and a text colour of white when activated, and a background colour of black and a text colour of white when deactivated. In other embodiments, a halo, such as a blue halo, may be displayed on and/or around the backspace button 410 to provide a visual indication that the backspace button 410 is activated. Other visual schemes, including other colour schemes, may be used to provide a visual indication that a button is activated or deactivated (sometimes alternatively referred to as selected or deselected/unselected).

When a variable repeat control mode of the button 410 is activated as described below, a visual indication of a variable repeat control mode area for receiving predetermined control input for varying the rate of repeating the action (i.e., backspace) of the backspace button 410 may be displayed on the touch-sensitive display 118. The visual indication of a variable repeat control mode area may be a UI window or box, which may be coloured different than the remainder of the UI screen to catch the attention of the device user. Other visual indications of a variable repeat control mode area may be used. While no visual indication of a variable repeat control mode area is shown in FIGS. 4A to 5C, a visual indication of the predetermined control input for varying the rate of repeating the action of the backspace button 410 is displayed on the touch-sensitive display 118. The visual indication of the predetermined control input is typically displayed in the visual indication of a variable repeat control mode area (e.g., UI window or box) when provided.

In FIG. 4A, the visual indication of the predetermined control input is a series of round brackets, also known as open brackets or parentheses, extending to the left of the backspace button 410. In the shown example, three round brackets "(((" are shown. The orientation of the brackets in a direction left of the backspace button 410 provides a visual indication that a touch gesture to the left, such as a left swipe, may be used to repeat the action of the backspace button 410 (e.g., backspace).

The embodiment shown in FIG. 4B is similar to that shown in 4A with the notable exception that a series of angle brackets, also known as triangular brackets or chevrons, are used as the visual indication of the predetermined control input rather than open brackets. The angle brackets are located to the left of the backspace button 410 as in FIG. 4A, however, in the example of FIG. 4B a single angle bracket "<" is followed by double angle brackets "<<" to provide a visual indication that the predetermined control input provides proportional control for varying the rate of repeating the action. The location of the double brackets further away from the backspace button 410 provides a visual indication that a touch gesture having longer travel distance, i.e. a touch gesture having a centroid which moves a longer distance over a duration of the touch gesture, will have a greater repeat rate.

In other embodiments, visual indications of the predetermined control input for varying the rate of repeating the action may be omitted.

Figure 5A:
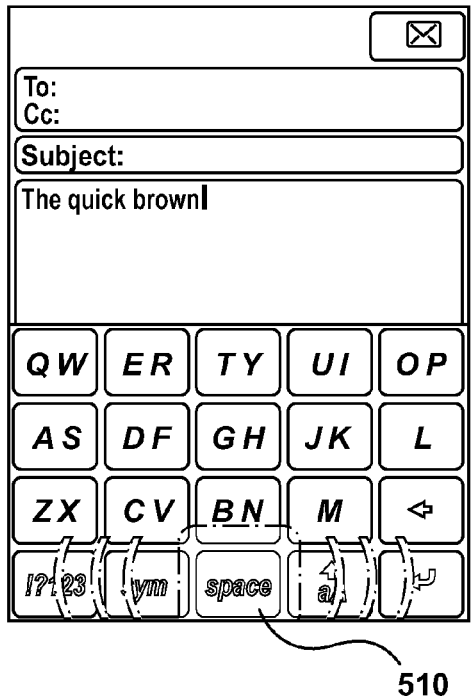
FIGS. 5A to 5C are example user interface screens having a space button with a variable repeat rate in accordance with the present disclosure.
Figure 5B:
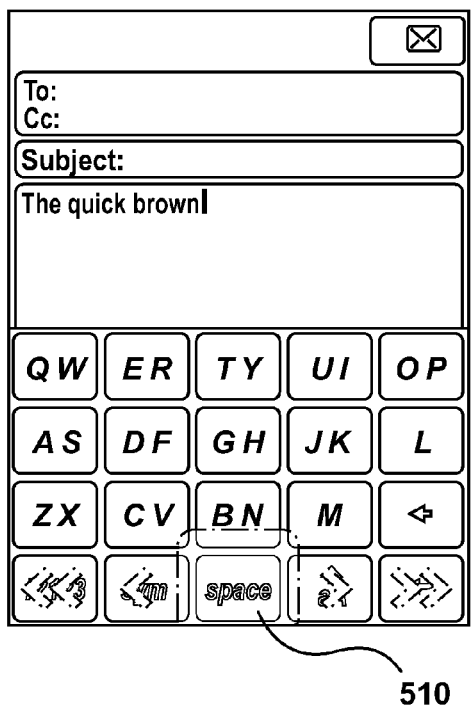
Figure 5C:
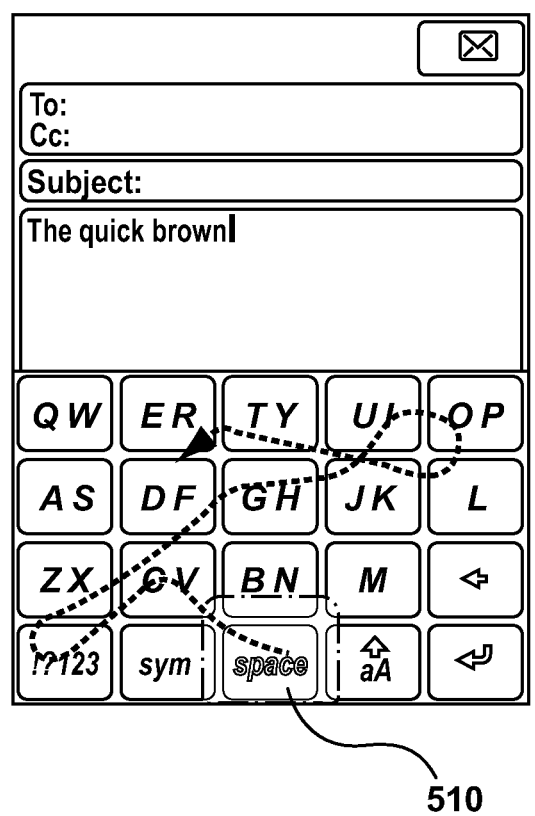

Referring now to FIGS. 5A to 5C, example user interface screens having a space button 510 with a variable repeat rate in accordance with the present disclosure are shown. The user interface screens shown in FIGS. 5A to 5C are similar to those of FIGS. 4A and 4B with the notable exception that the keyboard 404 includes a space button 510 rather than a backspace button 410 and that more than one predetermined control input are provided.

In FIG. 5A. the visual indication of a first predetermined control input is a first series of round brackets "(((" extending to the left of the space button 510. The visual indication of a second predetermined control input is a second series of round brackets ")))" extending to the right of the space button 510. In the shown example, three round brackets are shown for each predetermined control input. The orientation of the first series of brackets in a direction extending left of the space button 510 provides a visual indication that a touch gesture to the left, such as a left swipe, may be used to repeat the action of the space button 510 (e.g. space character input). Similarly, the orientation of the second series of brackets in a direction extending right of the space button 510 provides a visual indication that a touch gesture to the right, such as a right swipe, may be used to repeat the action of the space button 510 (e.g. space character input).

The embodiment shown in FIG. 5B is similar to that shown in 5A with the notable exception that angle brackets are used as the visual indication of the predetermined control input rather than open brackets. In the shown embodiment, the visual indication of a first predetermined control input is a first series of angle brackets "<<<" extending to the left of the space button 510. The visual indication of a second predetermined control input is a second series of angle brackets ">>>" extending to the right of the space button 510. As in FIG. 4B described above, a single angle bracket "<" followed by double angle brackets "<<" provides a visual indication that the predetermined control input provides proportional control for varying the rate of repeating the action. The location of the double brackets further away from the backspace button 410 provides a visual indication that a touch gesture having longer travel distance, i.e. a touch gesture having a centroid which moves a longer distance over a duration of the touch gesture, will have a greater repeat rate.

FIG. 5C shows an alternative embodiment in which the user interface screen does not provide a visual indication of the predetermined control input for varying the rate of repeating the action. The travel of the centroid of the touch gesture from an initial contact point on the space button 510 is shown in FIG. 5C using an arrowed line. The arrowed line has been added for the purpose of explanation and does not appear in the UI screen. The UI screen shown in FIG. 5C where no visual indication of the predetermined control input is provided may be useful in embodiments in which the predetermined control input is random movement with the rate of repeating the action dependent on a speed of the touch gesture or a travel distance of the touch gesture without regard to direction.

Other visual indications of the predetermined control input for varying the rate of repeating the action may be used in other embodiments. For example, when the predetermined control input is touch gesture in a predetermined direction, the visual indication may be, but is not limited to, a directional indication such as an arrow, graphic representation such as an icon, text or alternate bracket type such as square brackets (e.g., [ ]) or braces (e.g., { }).

Referring again to FIG. 3, in step 302 the portable electronic device 100 monitors for and detects activation input for activating the button in the user interface screen displayed on the touch-sensitive display 118. The button may be a backspace button 410 or space button 510 in the keyboard 404 as described above, or any other button having a repeatable action. The activation input may be, but is not limited to, a touch and hold gesture. A touch and hold gesture is detected or recognized when a touch event occurs for a duration which is greater than or equal to a threshold duration. The threshold duration may be, for example, 400 milliseconds in some embodiments. Other threshold durations are possible such as, for example, 250 milliseconds. A tap gesture is detected or recognized when a touch event occurs for a duration which is less than the threshold duration.

A touch and hold gesture occurs when a user touches a selectable onscreen item on the touch-sensitive display 118, such as a button or menu item, with a finger and holds the finger in contact with the touch-sensitive display 118 for a duration which exceeds the threshold duration. Touching a selectable onscreen item comprises touching a location of the touch-sensitive display 118 which is coincident with the selectable onscreen item displayed on the display 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display 112 in some embodiments, typically the input area being larger than the displayed area in such embodiments to accommodate touch offset of the user.

Next, in step 304 a variable repeat control mode of the button is activated in response to the activation input. The input for activating the variable repeat control mode is typically the input for activating the button in the user interface screen. This allows the device user to perform the regular action for activating the button, such as touching the button or clicking the button by pressing against the touch-sensitive display 118 so as to actuate the actuator 120. When the button has been activated for the threshold duration or the actuator 120 is actuated, the variable repeat control mode associated with the button is activated. In other embodiments, separate activation input for activating the variable repeat control mode may be used (such as activation of a hardware button).

Other methods for activating the variable repeat control mode include, but are not limited to, multiple touch inputs coincident with the button which are received within a threshold duration of each other, predetermined touch gestures coincident with the button such as a pinch or swipe, or activating a hardware button (e.g., while touching the button).

The variable repeat control mode, also known as the variable rate button action repeat control mode, is a temporary control mode introduced to control the repeat rate of the button. When the variable repeat control mode is activated, a variable repeat control mode area of the UI screen displayed on touch-sensitive display 118 is reserved for interpreting touch events, such as touch gestures, for varying the repeat rate of the action associated with the button. The touch gestures provide fine and course grained control over the repeat rate of the action associated with the button.

The variable repeat control mode area may be overlaid overtop of any existing GUI components. Touch events within the variable repeat control mode area will be interpreted for varying the repeat rate of the action associated with the button and will not be relayed to any underlying GUI components. The variable repeat control mode area may include the area of the button in the UI screen. The variable repeat control mode area may be the entire UI screen, or the entire input area of the touch-sensitive display 118 in some embodiments.

A visual indication of the variable repeat control mode area may be provided. Alternatively, the visual state of the button may be changed to indicate that the button has entered the variable repeat control mode rather than a visual indication of the variable repeat control mode area, or no visual indication may be provided.

Next, in step 306 the portable electronic device 100 monitors for and detects predetermined control input for repeating the action associated with the button. The action may be any suitable action including, but not limited to, a backspace action of backspace button, space character entry of a space button, or delimiter input entry of an ENTER button. The predetermined control input may be a touch gesture performed by touching the touch-sensitive display 118 in a predetermined manner, typically using a finger, and detected by the touch-sensitive display 118. The touch gesture may be performed at any location in the variable repeat control mode area of the touch-sensitive display 118. In some embodiments, a centroid of the touch gesture may move outside of the variable repeat control mode area provided that an initial contact point of the touch gesture is within the variable repeat control mode area. The touch gesture may comprise a series of small movements which are evaluated during the touch event with respect to a centroid of the touch event, or a swipe gesture which is evaluated after the corresponding touch event has ended.

The touch gesture may be a random movement in any two-dimensional direction as that shown by the arrowed lined in FIG. 5C. When the touch gesture of the predetermined control input is a random movement, the rate of repeating the action is dependent on a speed of the touch gesture or a travel distance of the touch gesture without regard to direction. Alternatively, the touch gesture may be a movement in a predetermined direction (e.g., horizontal, vertical, etc.) as shown in FIGS. 4A, 4B, 5A and 5B. The touch gesture comprising movement in a predetermined direction is defined by a touch event having a centroid which moves from an initial contact point by an amount which exceeds a threshold distance in the predetermined direction (typically measured in displayed pixels). The predetermined direction may be a generally horizontal direction (i.e., left or right) relative to the screen orientation of the GUI, or a generally vertical direction (i.e., up or down) relative to the screen orientation of the GUI. Horizontal movements are often more intuitive for device users, however, both vertical and horizontal movements may be used in different embodiments.

A touch gesture in the horizontal direction may have a vertical component as well as a horizontal component provided that the vertical component is within a threshold tolerance, or the ratio of the vertical component to the horizontal component is within a threshold tolerance. Similarly, a touch gesture in the vertical direction may have a horizontal component as well as a vertical component provided that the horizontal component is within a threshold tolerance, or the ratio of the horizontal component to the vertical component is within a threshold tolerance. Touch data reported by the touch-sensitive display 118 may be analyzed to determine whether the horizontal component or vertical component is less than the threshold tolerance. When it is less than the threshold tolerance, the touch gesture is considered to be in a generally horizontal direction or a generally vertical direction as the case may be. When it is more than the threshold tolerance, the touch gesture is not considered generally horizontal direction or generally vertical direction.

Swipe gestures have a single direction and do not comprise a number of movements. Swipe gestures are evaluated by the portable electronic device 100 after the corresponding touch event has ended. The direction of the swipe gesture is evaluated with respect to an initial contact point of the touch event at which the finger makes contact with the touch-sensitive display 118 and a terminal (or ending) contact point at which the finger is lifted from the touch-sensitive display 118. Examples of swipe gestures include a horizontal swipe gesture and vertical swipe gesture. A horizontal swipe gesture typically comprises an initial contact with the touch-sensitive display 118 towards its left or right edge to initialize the gesture, followed by a horizontal movement of the point of contact from the location of the initial contact to the opposite edge while maintaining continuous contact with the touch-sensitive display 118, and a breaking of the contact at the opposite edge of the touch-sensitive display 118 to complete the horizontal swipe gesture. Similarly, a vertical swipe gesture typically comprises an initial contact with the touch-sensitive display 118 towards its top or bottom edge to initialize the gesture, followed by a vertical movement of the point of contact from the location of the initial contact to the opposite edge while maintaining continuous contact with the touch-sensitive display 118, and a breaking of the contact at the opposite edge of the touch-sensitive display 118 to complete the vertical swipe gesture.

Swipe gestures may be of various lengths, may be initiated in various places within the variable repeat control mode area on the touch-sensitive display 118, and need not span the full dimension of the touch-sensitive display 118. In addition, breaking contact of a swipe may be gradual, in that contact pressure on the touch-sensitive display 118 is gradually reduced while the swipe gesture is still underway.

Next, in step 308 the portable electronic device 100 repeats the action associated with the button when the predetermined control input is received by the portable electronic device 100 and detected, for example, by the processor 102. The rate at which the action is repeated is dependent on the predetermined control input. The rate may be proportional to the predetermined control input. The predetermined control input, in at least some embodiments, is a touch gesture performed after maintaining contact with the touch-sensitive display 118 after activating the button. The rate of repeating the action may be dependent on either a speed of the touch gesture or a travel distance of the touch gesture. The speed or travel distance may be measured by the movement of the centroid of the touch gesture over its duration.

Random movements may be used to control the repeat rate or number of repeats of the action in some embodiments. In such embodiments, the rate that the action is repeated may be dependent on the distance that the centroid of the touch event has moved relative to a previous location without regard to direction, the activated button, or an initial location of the touch gesture. The distance moved by the centroid is referred to as the travel distance of the touch gesture. The action, e.g., backspace of the backspace button 410, or space character input of the space button 510, may be repeated each time the centroid of the touch gesture moves a threshold distance relative to the previous location. The threshold distance may be measured in a straight line from the previous location (e.g., previous location where the action was repeated). In some embodiments, the threshold distance is 10 linear pixels, however, other threshold distances may be used. Linear pixels are pixels measured in a straight line rather than a curved or irregular path. The action may be repeated at a default interval in the absence of the predetermined control input. This is convenient when the user does not wish to control the number of repeats or a repeat rate of the action. Alternatively, in other embodiments the action is not repeated in the absence of the predetermined control input.

In other embodiments, throttle-style movements may be used to control the repeat rate or number of repeats of the action. In such embodiments, the rate of repeating may be proportional to a multiplier calculated as the distance from an initial location coincident with the button, such as the closest edge of the button, divided by a threshold distance (e.g., 10 linear pixels) rounded to the nearest integer. A default button (or key) repeat rate may be multiplied by this multiplier to arrive at the adjusted repeat rate. For example, a default key repeat rate of one key repeat every 250 milliseconds may be used in some embodiments. The repeat rate is based on the finger's distance (centroid of the touch gesture reported by the touch-sensitive display 118) from the closest edge of the button. In other words, the further the finger (e.g., centroid) is from an edge of the button, the faster the action is repeated. Similarly, the closer the finger (e.g., centroid) is to an edge, the slower the button action is repeated. The initial location may be the centroid of the touch event activating the button rather than an edge of the activated button. For example, if the threshold distance is 10 linear pixels and the distance of centroid of the touch gesture from the initial location is 30 linear pixels, the multiplier is 3 (30/10=3). Increasing the repeat rate by a multiplier provides a control scheme in which a user's finger does not have to move far from the location of the button to control the repeat rate.

When the centroid of the touch gesture remains within the bounds of the button, the action may be repeated at a default interval in the absence of the predetermined control input. Alternatively, in other embodiments the action is not repeated in the absence of the predetermined control input.

When the distance from an initial location is used rather than a previous location in the context of random movement, the direction of the movement of the centroid from this location may be used to correspond to different actions. Examples of a user interface screen for such an example is shown in FIGS. 5A and 5B. For example, the repeat rate could be increased in a first direction (e.g., movement to the right) and decreased in a second direction (e.g., movement to the left). Alternatively, when the button is a space button 510, the movement in one direction (e.g., movement to the right of the space button 510) may insert space characters at a rate proportional to the distance from the button whereas movement in a second direction (e.g., movement to the right of the space button 510) may insert backspace at a rate proportional to the distance from the space button 510.

The first direction and second direction may be generally opposite to each other to provide more intuitive control for device users, however, the first and second directions may be oriented differently with respect to each other. Similarly, the first direction and second direction may be left and right relative to the screen orientation of GUI, respectively, to provide more intuitive control for device users, however, vertical directions, vertical and horizontal directions, or clockwise or counterclockwise directions may be used in different embodiments.

In other embodiments, the predetermined control input for repeating the action associated with the button may be a particular type of touch gesture including, but not limited to, a circular gesture, pinch gesture, or swipe, etc. When the predetermined control input is a circular gesture, the direction of the touch gesture is clockwise or counterclockwise. The direction of the touch gesture may be used to perform different key repeat actions. For example, movement in one direction (e.g., clockwise relative to the space button 510) may insert space characters whereas movement in a second direction (e.g., counterclockwise relative to the space button 510) may insert backspace.

Alternatively, in other embodiments, rather than controlling a rate at which the action is repeated, the predetermined control input may repeat the action by an amount which is dependent on the predetermined control input. In other words, the action may be repeated a number of times based on predetermined control input, such as a speed of the touch gesture or a travel distance of the touch gesture, typically without regard to direction. For example, the travel distance (e.g. 10 linear pixels of movement) could be translated into a corresponding number of key/button repeats (e.g., 1) in accordance with a ratio of distance to repeats (e.g., 10:1). The action is typically repeated at a default interval in the absence of the predetermined control input. This is convenient when the user does not wish to control the number of repeats or a repeat rate of the action. Repeating the action a number of repeats based on a distance or speed of the touch gesture may be more effective for a control scheme based on random movement or a control scheme based on a particular type of touch gesture such as circular touch gesture. In contrast, increasing the repeat rate by a multiplier may be more effective for a control scheme based on throttle-style movement in which a user's finger does not have to move far from the button to control the repeat rate.

Next, in step 310 the variable repeat control mode is deactivated in response to deactivation input for deactivating the variable repeat control mode of the button. The variable repeat control mode associated with the button may be deactivated by performing the regular action for deactivating the button such as breaking contact with the touch-sensitive display 118, for example, by lifting the finger after performing the predetermined control input for repeating the action associated with the at least one button, or unclicking the button by pressing against the touch-sensitive display 118 so as to actuate the actuator 120.

Other methods for deactivating the variable repeat control mode include, but are not limited to, activating an area or UI component outside of the variable repeat control mode area, activating a hardware button, multiple touch inputs coincident with the button which are received within a threshold duration of each other, or predetermined touch gestures coincident with the button such as a pinch or swipe.

When the variable repeat control mode is deactivated, the UI components of the user interface screen within the variable repeat control mode area return to normal operation and receive touch inputs from the user in the ordinary way.

Unlike conventional buttons in which the action associated with the button is repeated on an interval basis, the present disclosure provides a method in which the repeat rate of a button may be directly controlled by the user without having the user repeatedly activate the button. This reduces wear on the portable electronic device and may reduce the error rate when repeating action compared to conventional approaches.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method of controlling touch input on a touch-sensitive display of a portable electronic device, the method comprising:
    displaying a keyboard having at least one button on the touch-sensitive display, the at least one button being activatable by a first control input for a single instance of a text editing action;
    providing an input element separate from the at least one button, the input element being activatable to activate a variable repeat control mode;
    when the variable repeat control mode is activated:
        in response to receipt of a second control input, repeating the text editing action associated with the at least one button of the keyboard at an input rate dependent on the second control input; and
    when the variable repeat control mode is not activated:
        disabling ability of the second control input to cause repeated text editing action and reverting to enabling the first control input to cause a single instance of the text editing action.

2. The method of claim 1, wherein the rate is proportional to the second control input.

3. The method of claim 1, wherein the second control input is a touch gesture detected by the touch-sensitive display, and the rate is dependent on a speed of the detected touch gesture or a travel distance of the detected touch gesture.

4. The method of claim 3, wherein the text editing action is repeated a defined number of times defined by a travel distance of the detected touch gesture, wherein the text editing action is performed once for every length of a threshold distance travelled by a centroid of the touch gesture.

5. The method of claim 4, wherein the threshold distance is 10 linear pixels, wherein the text editing action is performed once for every length of 10 linear pixels travelled by the centroid of the touch gesture.

6. The method of claim 1, wherein the second control input is a touch gesture detected by the touch-sensitive display, wherein the rate is proportional to a distance of a centroid of the touch gesture from a location of the button.

7. The method of claim 6, wherein the location of the at least one button is an edge of the at least one button.

8. The method of claim 6, wherein the location is a centroid of the touch input activating the at least one button.

9. The method of claim 6, wherein the rate is increased in response to movement of the centroid in a first direction and decreased in response to movement of the centroid in a second direction generally opposite to the first direction.

10. The method of claim 1, further comprising:
    when the variable repeat control mode is activated, repeating the text editing action at a default interval in the absence of the second control input.

11. The method of claim 1, wherein, when the variable repeat control mode is activated, the text editing action is not repeated in the absence of the second control input.

12. The method of claim 1, further comprising:
    displaying the at least one button in a first visual state when the variable repeat control mode of the at least one button is not activated;
    displaying the at least one button in a second visual state different from the first visual state when the variable repeat control mode of the at least one button is activated.

13. The method of claim 1, wherein a visual indication of the predetermined control input for varying the rate of repeating the action is displayed on the touch-sensitive display when the variable repeat control mode is activated.

14. The method of claim 1, wherein a variable repeat control mode area is defined for receiving the second control input.

15. The method of claim 14, wherein a visual indication of the variable repeat control mode area is displayed on the keyboard when the variable repeat control mode is activated.

16. The method of claim 1, wherein the input element separate from the at least one button is a hardware element of the portable electronic device.

17. An electronic device, comprising:
    a processor;
    a touch-sensitive display having a touch-sensitive overlay coupled to the processor;
    wherein the processor is configured for causing:
    displaying a keyboard having at least one button on the touch-sensitive display, the at least one button being activatable by a first control input for a single instance of a text editing action; providing an input element separate from the at least one button, the input element being activatable to activate a variable repeat control mode;
    when the variable repeat control mode is activated:
        in response to receipt of a second control input, repeating the text editing action associated with the at least one button of the keyboard at an input rate dependent on the second control input; and
    when the variable repeat control mode is not activated:
        disabling ability of the second control input to cause repeated text editing action and reverting to enabling the first control input to cause a single instance of the text editing action.

18. A non-transitory computer readable medium having instructions stored thereon, wherein the instructions, when executed by a processor of a portable electronic device having a touch-sensitive display, causes the portable electronic device to:
    display a keyboard having at least one button on the touch-sensitive display, the at least one button being activatable by a first control input for a single instance of a text editing action;
    provide an input element separate from the at least one button, the input element being activatable to activate a variable repeat control mode;
    when the variable repeat control mode is activated:
        in response to receipt of a second control input, repeat the text editing action associated with the at least one button of the keyboard at an input rate dependent on the second control input; and
    when the variable repeat control mode is not activated:
        disable ability of the second control input to cause repeated text editing action and revert to enabling the first control input to cause a single instance of the text editing action.

19. The computer readable medium of claim 18, wherein the second control input is a touch gesture detected by the touch-sensitive display, and the rate is dependent on a speed of the detected touch gesture or a travel distance of the detected touch gesture.

20. The computer readable medium of claim 19, wherein the text editing action is repeated a defined number of times defined by a travel distance of the detected touch gesture, wherein the text editing action is performed once for every length of a threshold distance travelled by a centroid of the touch gesture.

* * * * *

UNITED STATES PATENT AND TRADEMARK OFFICE
CERTIFICATE OF CORRECTION

PATENT NO. : 9,285,988 B2
APPLICATION NO. : 13/028042
DATED : March 15, 2016
INVENTOR(S) : Jeffrey Brent Kenney et al.

It is certified that error appears in the above-identified patent and that said Letters Patent is hereby corrected as shown below:

In the claims,

Column 13, Line 59, In Claim 8, delete "touch input activating the at least one button" and insert -- second control input --, therefor.

Column 14, Line 13, In Claim 13, delete "predetermined" and insert -- second --, therefor.

Signed and Sealed this
Fifth Day of July, 2016

Michelle K. Lee
*Director of the United States Patent and Trademark Office*